United States Patent
Akamine et al.

(10) Patent No.: US 12,216,194 B2
(45) Date of Patent: Feb. 4, 2025

(54) TARGET TRACKING DEVICE

(71) Applicant: DENSO CORPORATION, Kariya (JP)

(72) Inventors: Yusuke Akamine, Nisshin (JP);
Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 414 days.

(21) Appl. No.: 17/645,566

(22) Filed: Dec. 22, 2021

(65) Prior Publication Data

US 2022/0113397 A1   Apr. 14, 2022

Related U.S. Application Data

(63) Continuation of application No. PCT/JP2020/023402, filed on Jun. 15, 2020.

(30) Foreign Application Priority Data

Jun. 25, 2019  (JP) .................................. 2019-117142

(51) Int. Cl.
| | |
|---|---|
| *G01S 13/72* | (2006.01) |
| *G01S 7/41* | (2006.01) |
| *G01S 13/931* | (2020.01) |

(52) U.S. Cl.
CPC ............ *G01S 13/726* (2013.01); *G01S 7/415* (2013.01); *G01S 13/931* (2013.01)

(58) Field of Classification Search
CPC .... G01S 13/931; G01S 13/723; G01S 13/726; G01S 13/62; G01S 13/52; G01S 13/60; G01S 13/66; G01S 13/58; G01S 13/72; G01S 2013/932; G01S 7/415; B60W 30/095; B60W 30/0956

USPC .................... 342/179, 70; 701/301
See application file for complete search history.

(56) References Cited

U.S. PATENT DOCUMENTS

| | | | | |
|---|---|---|---|---|
| 7,034,742 | B2 * | 4/2006 | Cong ................. | B60K 31/0008 342/107 |
| 7,522,091 | B2 * | 4/2009 | Cong ..................... | G01C 21/26 342/107 |
| 7,626,533 | B2 * | 12/2009 | Cong ..................... | G01C 21/26 342/195 |

(Continued)

FOREIGN PATENT DOCUMENTS

| | | |
|---|---|---|
| JP | 4-53394 B2 | 8/1992 |
| JP | H04-053394 B2 | 8/1992 |

(Continued)

*Primary Examiner* — Ladimir Magloire
*Assistant Examiner* — Michael W Justice
(74) *Attorney, Agent, or Firm* — Maschoff Brennan

(57) ABSTRACT

In a target tracking device, a state quantity estimation unit is configured to, every time a preset repetition period of a processing cycle elapses, estimate, for each of the one or more targets, a current state quantity based on at least either observation information of the one or more targets observed by a sensor or past state quantities of the one or more targets. A model selection unit is configured to, for each of the one or more targets, select one motion model from a plurality of predefined motion models, based on at least either states of the one or more targets or a state of the vehicle. An estimation selection unit is configured to, for each of the one or more targets, cause the state quantity estimation unit to estimate the state quantity of the target with the one motion model selected by the model selection unit.

17 Claims, 11 Drawing Sheets

(56) References Cited

U.S. PATENT DOCUMENTS

| | | | |
|---|---|---|---|
| 7,920,087 B2 * | 4/2011 | Ogawa | G01S 17/89 342/146 |
| 7,982,658 B2 * | 7/2011 | Kauffman | G01S 13/953 342/26 B |
| 8,666,563 B2 * | 3/2014 | Tokumochi | B60W 50/10 180/274 |
| 8,676,487 B2 * | 3/2014 | Sakai | B60W 40/02 701/300 |
| 10,739,769 B2 * | 8/2020 | Dean | G05D 1/0214 |
| 11,023,744 B2 * | 6/2021 | Kawano | G06V 20/588 |
| 11,169,252 B2 * | 11/2021 | Takayama | G01S 13/72 |
| 11,334,070 B2 * | 5/2022 | Dean | G06T 7/292 |
| 2005/0179580 A1 * | 8/2005 | Cong | G01S 13/723 342/107 |
| 2005/0225477 A1 * | 10/2005 | Cong | B60K 31/0083 342/72 |
| 2008/0065328 A1 | 3/2008 | Eidehall et al. | |
| 2008/0183419 A1 * | 7/2008 | Cong | B60K 31/0066 702/155 |
| 2009/0040095 A1 * | 2/2009 | Ogawa | G01S 17/89 342/70 |
| 2010/0245165 A1 * | 9/2010 | Kauffman | G01S 13/953 342/26 B |
| 2011/0071731 A1 | 3/2011 | Eidehall et al. | |
| 2011/0313664 A1 * | 12/2011 | Sakai | B60W 40/02 701/301 |
| 2012/0179304 A1 * | 7/2012 | Tokumochi | B60W 50/10 701/1 |
| 2013/0238181 A1 * | 9/2013 | James | B60W 30/0956 701/23 |
| 2014/0236386 A1 * | 8/2014 | Yoshizawa | B60W 30/08 701/1 |
| 2018/0129214 A1 * | 5/2018 | Düring | G06V 20/58 |
| 2018/0293447 A1 * | 10/2018 | Kawano | G06T 7/12 |
| 2019/0049968 A1 * | 2/2019 | Dean | G06V 20/58 |
| 2019/0204433 A1 * | 7/2019 | Bui | G01S 13/723 |
| 2019/0310637 A1 * | 10/2019 | Dean | G06T 7/292 |
| 2020/0064850 A1 * | 2/2020 | Hong | B60W 30/09 |
| 2022/0334580 A1 * | 10/2022 | Dean | B60W 30/0956 |

FOREIGN PATENT DOCUMENTS

| | | |
|---|---|---|
| JP | 2002-260192 A | 9/2002 |
| JP | 4348535 B2 | 10/2009 |

* cited by examiner

TARGET TRACKING DEVICE

CROSS-REFERENCE TO RELATED APPLICATION

This application is a continuation application of International Application No. PCT/JP2020/023402 filed Jun. 15, 2020 which designated the U.S. and claims priority to Japanese Patent Application No. 2019-117142 filed with the Japan Patent Office on Jun. 25, 2019, the contents of each of which are incorporated herein by reference.

BACKGROUND

Technical Field

The present disclosure relates to a target tracking device for tracking a target located in surroundings of a vehicle.

Related Art

Typically, to calculate state quantities, such as a position, a velocity and the like, of a target using a vehicle-mounted radar, a filtering process is performed on predicted values of the position, the velocity and the like of the target in the current processing cycle acquired from their estimates acquired in the previous processing cycle and observed values of the position, the velocity and the like of the target acquired in the current processing cycle. However, if there is a discrepancy between a motion model used to calculate the predicted values and the actual motion of the target, the state quantities of the target can not be estimated accurately. A known target tracking device is configured to cause each of a plurality of filtering units with different motion models to estimate state quantities of a target, and select outputs from one of the filtering units according to convergence statuses of estimations of the state quantities, thereby acquiring accurate estimations.

DESCRIPTION OF SPECIFIC EMBODIMENTS

Figure 1A:
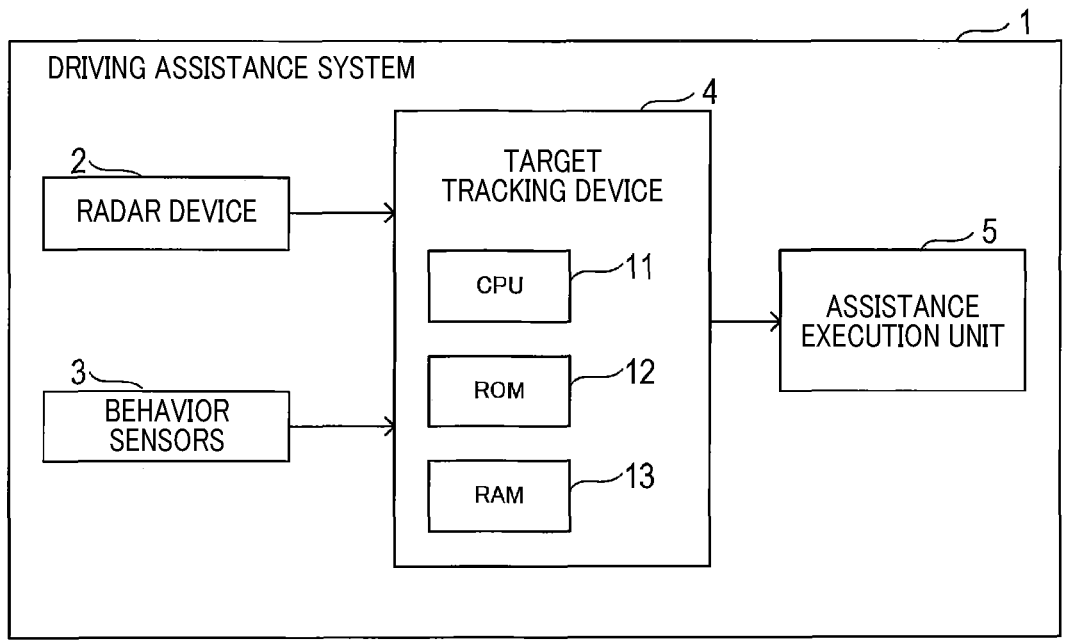
FIG. 1A is a block diagram of a driving assistance system.

According to a result of detailed research that was performed by the present inventors, an issue was found that the technique for the above known target tracking device, as disclosed in Japanese Patent No. 4348535, requires multiple filtering processes to be performed in parallel for one target, which leads to an increased processing load.

In view of the foregoing, it is desired to have a technique for accurately tracking a target while suppressing an increase in processing load.

One aspect of the present disclosure provides a target tracking device for tracking one or more targets located in surroundings of a vehicle, which is configured to be mounted to the vehicle and includes a state quantity estimation unit, a model selection unit, and an estimation selection unit.

The state quantity estimation unit is configured to, every time a preset repetition period of a processing cycle elapses, estimate, for each of the one or more targets, a current state quantity based on at least either observation information of the one or more targets observed by a sensor or past state quantities of the one or more targets.

The model selection unit is configured to, for each of the one or more targets, select one motion model from a plurality of predefined motion models, based on at least either states of the one or more targets or a state of the vehicle.

The estimation selection unit is configured to, for each of the one or more targets, cause the state quantity estimation unit to estimate the state quantity of the target with the one motion model selected by the model selection unit.

The target tracking device configured as above estimates, for one target, the state quantity using one motion model. Thus, the target tracking device can suppress occurrence of a situation where multiple motion models are used in parallel for one target, and can thus suppress an increase in processing load. In addition, the target tracking device selects one motion model from the plurality of motion models to estimate, for each of the one or more targets, the current state quantity of the target. Therefore, the target tracking device can select one suitable motion model for each of the one or more targets to estimate the state quantity, and can improve the estimation accuracy of the state quantity. This allows the target tracking device to track the targets with high accuracy.

Hereinafter, exemplary embodiments of the present disclosure will be described in detail with reference to the accompanying drawings, in which like reference numerals refer to like or similar elements regardless of reference numerals and duplicated description thereof will be omitted.

First Embodiment

Hereinafter, a first embodiment of the present disclosure will be described with reference to the accompanying drawings.

A driving assistance system 1 of this embodiment is mounted to a vehicle and includes, as illustrated in FIG. 1A, a radar device 2, behavior sensors 3, a target tracking device 4, and an assistance execution unit 5. The vehicle carrying the driving assistance system 1 is hereinafter referred to as an own vehicle.

Figure 2:
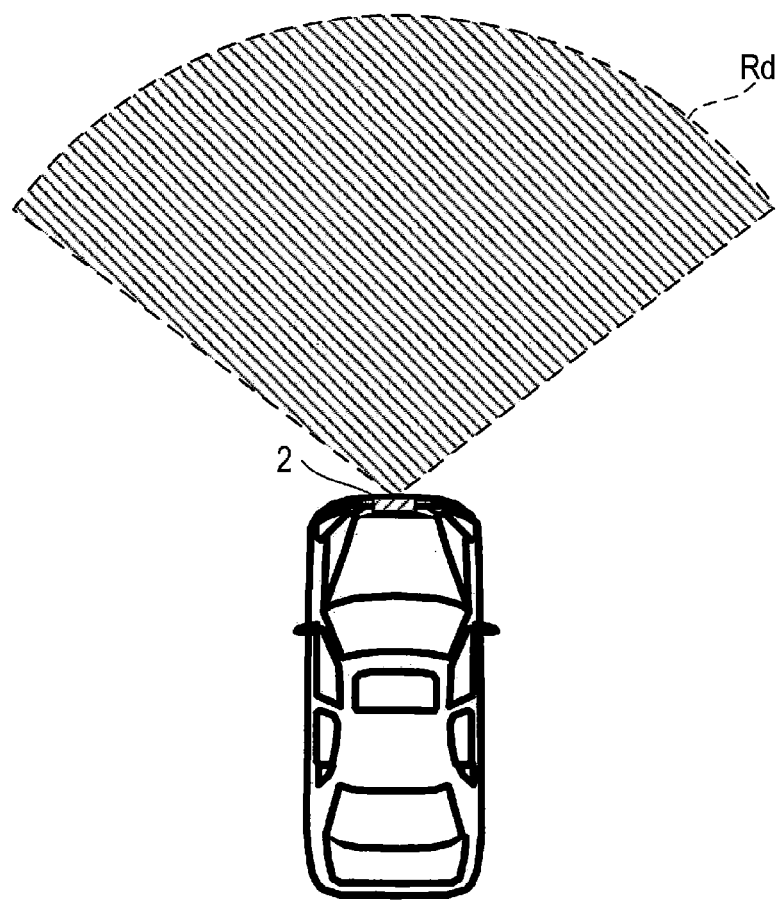
FIG. 2 is an illustration of an installation position and a detection region of a radar device according to a first embodiment.

The radar device 2 transmits radar waves, such as millimeter waves or microwaves, and receives reflected radar waves. As illustrated in FIG. 2, the radar device 2 transmits radar waves in the forward direction of the own vehicle, and generates information about reflection points that are present within a detection region Rd and reflected the radar waves (hereinafter referred to as observation information). The observation information includes a distance to each reflection point, an azimuth of each reflection point, a relative velocity of each reflection point, and the intensity of the radar wave reflected at each reflection point (hereinafter referred to as the reflection intensity).

As illustrated in FIG. 1A, the behavior sensors 3 include various devices for detecting information about behaviors of the own vehicle and information about driving operations that affect the behaviors of the own vehicle. For example, the information detected by the behavior sensors 3 includes amounts of actuation of an accelerator pedal, amounts of actuation of a brake pedal, steering angles, vehicle velocities, and vehicle accelerations.

The target tracking device 4 tracks targets located in surroundings of the own vehicle based on the observation information generated by the radar device 2 and generates target information that indicates state quantities of the tracked targets.

The target tracking device 4 is an electronic control unit configured around a microcomputer including a central processing unit (CPU) 11, a read-only memory (ROM) 12, a random-access memory (RAM) 13, and the like. Various functions of the microcomputer are implemented by the CPU 11 executing a program stored in a non-transitory tangible storage medium. In this example, the ROM 12 corresponds to the non-transitory tangible storage medium in which the program is stored. A method corresponding to this program is performed by executing the program. Some or all of the functions implemented by the CPU 11 may be configured in hardware by one or more integrated circuits (ICs) or the like. In addition, one or more microcomputers may configure the target tracking device 4.

The assistance execution unit 5 may include, for example, an actuator, an audio device, a display device, and other devices. Based on the target information generated by the target tracking device 4, the assistance execution unit 5 controls the behavior of the own vehicle and provides warnings to the driver of the own vehicle.

The process flow of a tracking process performed by the CPU 11 of the target tracking device 4 will now be described. The tracking process is repeatedly performed every processing cycle during operation of the target tracking device 4. The repetition period of the processing cycle is $\Delta T$. In the following, a target subjected to the tracking process is called a tracked target.

Figure 3:
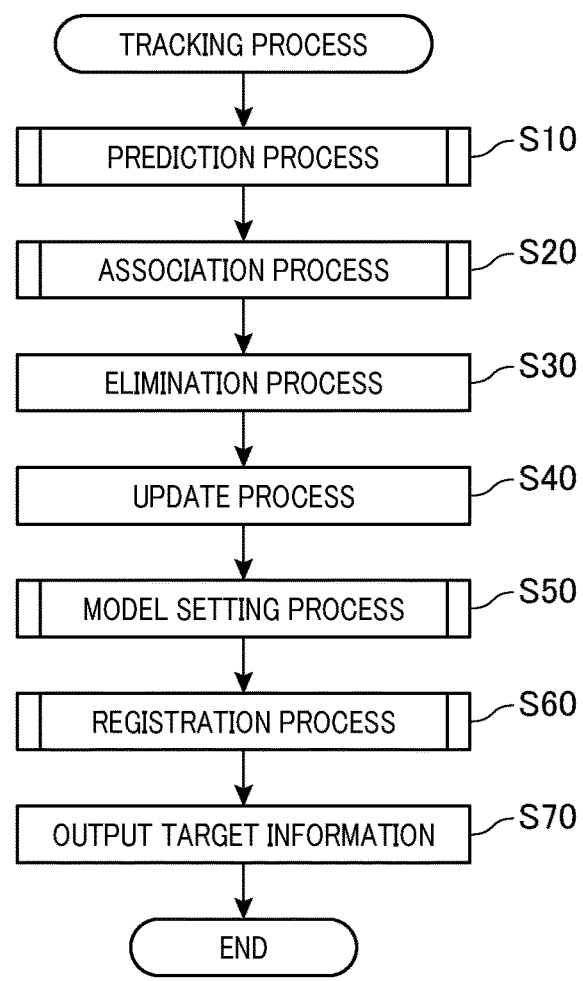
FIG. 3 is a flowchart of a tracking process.

Upon initiation of the tracking process, the CPU 11 first performs a prediction process at S10, as illustrated in FIG. 3. The process flow of the prediction process performed at S10 will now be described.

Figure 4:
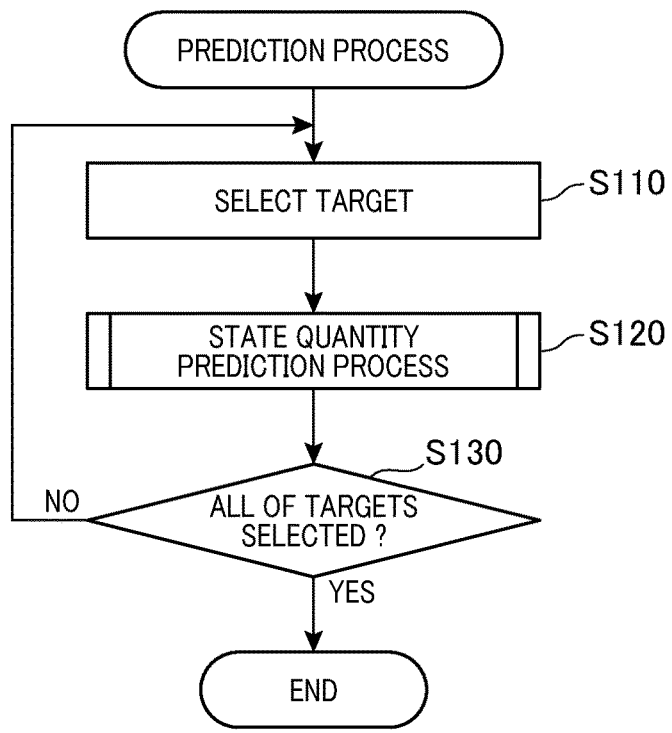
FIG. 4 is a flowchart of a prediction process.

As illustrated in FIG. 4, upon initiation of the prediction process, the CPU 11 first at S110 selects, from one or more tracked targets, one tracked target that has not been yet selected in the current prediction process. The selected tracked target is hereinafter referred to as a subject target.

Then, at S120, the CPU 11 performs a state quantity prediction process. The process flow of the state quantity prediction process performed at S120 will now be described.

Figure 5:
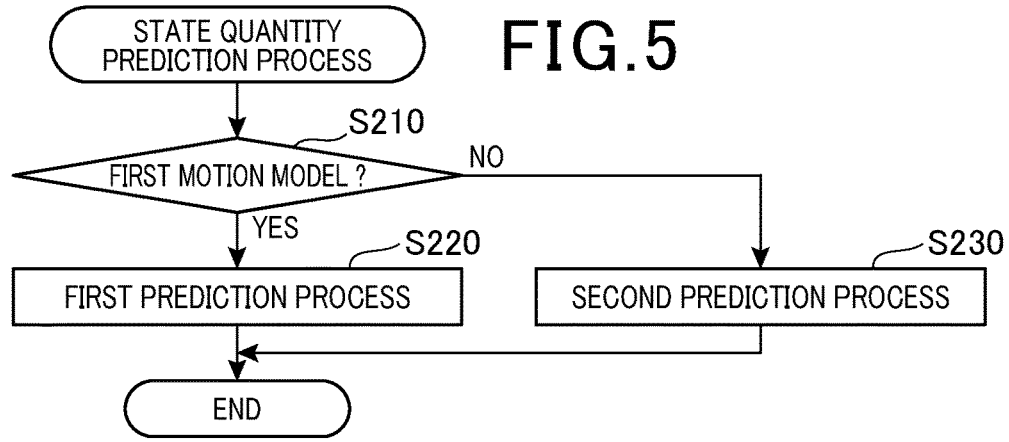
FIG. 5 is a flowchart of a state quantity prediction process.

Upon initiation of the state quantity prediction process, as illustrated in FIG. 5, the CPU 11 first at S210 determines whether a first motion model described later or a second motion model described later is set for the subject target. If the first motion model is set, the CPU 11 performs the first prediction process described later at S220, and terminates the state quantity prediction process. If the second motion model is set, the CPU 11 performs the second prediction process described later at S230, and terminates the state quantity prediction process.

The first prediction process performed at S220 will now be described.

In the first prediction process, using the first motion model, the CPU 11 calculates a predicted value of a state vector of the subject target in the current processing cycle based on an estimate of the state vector of the subject target acquired in the previous processing cycle. The following equations (1) to (6) are equations representing an extended Kalman filter.

$X_{k|k-1}$ is the predicted value of the state vector (i.e., the prediction vector). $X_k$ is the estimate of the state vector. $z_k$ is an observed value. $P_{k|k-1}$ is an error covariance matrix of the predicted value of the state vector. $P_k$ is an estimate of the error covariance matrix. $S_k$ is an innovation matrix. $K_k$ is a Kalman gain. $f$ is a function that gives the predicted value from the previous state quantity. $h$ is a function that gives the observed value. $Q_k$ is a variance of process noise. $F_k$ is a state transition matrix defined by the Jacobian of the function $f$. $R_k$ is an error covariance matrix of observed noise. $H_k$ is a transformation matrix that maps the state space defined by the Jacobian of the function $h$ to the observation space. $X_0$ is an initial value of the state vector (i.e., an initial estimation vector), and $P_0$ is an initial value of the error covariance matrix.

$$X_{k|k-1} = f(X_{k-1}) \tag{1}$$

$$P_{k|k-1} = F_{k-1}P_{k-1}F_{k-1}^T + Q_{k-1} \tag{2}$$

$$S_k = H_k P_{k|k-1} H_k^T + R_k \tag{3}$$

$$K_k = P_{k|k-1} H_k^T S_k^{-1} \tag{4}$$

$$P_k = (I - K_k H_k) P_{k|k-1} \tag{5}$$

$$X_k = X_{k|k-1} + K_k(z_k - h(X_{k|k-1})) \tag{6}$$

Figure 11:
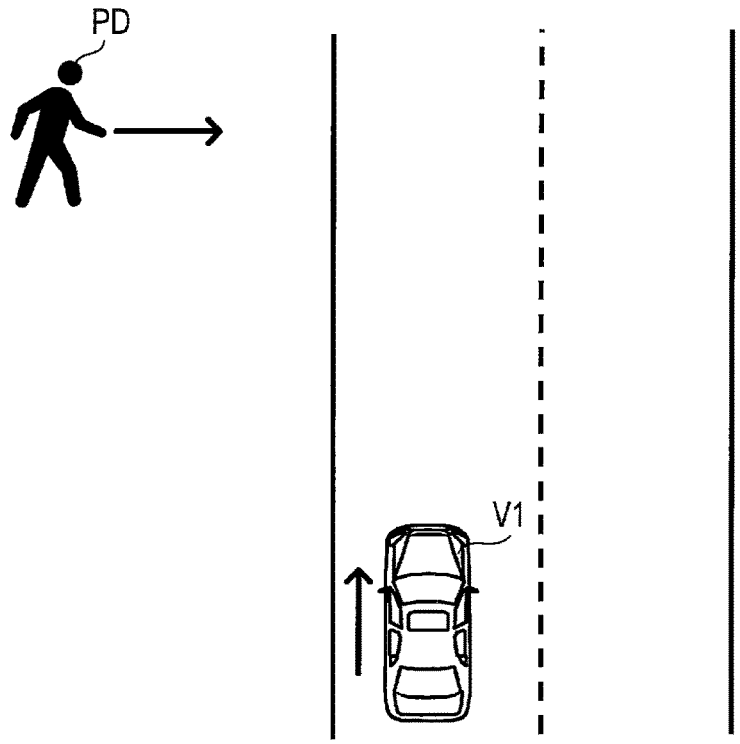
FIG. 11 is an illustration of a pedestrian going straight ahead of an own vehicle to cross a road.

The first motion model is a linear motion model. As illustrated in FIG. 11, the linear motion model is used to detect a pedestrian PD who is going straight ahead of the own vehicle V1 to cross a road.

In the first motion model, state quantities of the target are a lateral position x, a longitudinal position y, a lateral velocity $v_x$, and a longitudinal velocity $v_y$. The state vector, which is a vector representation of these state quantities as elements, is represented by $X = [x, y, v_x, v_y]^T$. The lateral direction is the width direction of the own vehicle, and the longitudinal direction is the direction normal to the width direction.

In the first motion model, the predicted values of the state quantities in the current processing cycle are expressed by the state vector $X_{k|k-1} = [x', y', v_x', v_y']^T$, and the estimates of the state quantities in the previous processing cycle are expressed by the state vector $X_{k-1} = [x, y, v_x, v_y]^T$. The function $f$ is then set such that a relationship illustrated in the equation (7) is established between the state vector $X_{k|k-1}$ and the state vector $X_{k-1}$.

$$\begin{bmatrix} x' \\ y' \\ v_x' \\ v_y' \end{bmatrix} = f\left(\begin{bmatrix} x \\ y \\ v_x \\ v_y \end{bmatrix}\right) = \begin{bmatrix} x + v_x \Delta T \\ y + v_y \Delta T \\ v_x \\ v_y \end{bmatrix} \tag{7}$$

That is, in the first prediction process at S220, using the function defined in the equation (7), the CPU 11 calculates the predicted value of the state vector in the current processing cycle according to the equation (1) and calculates the error covariance matrix of the predicted value of the state vector in the current processing cycle according to the equation (2).

The second prediction process performed at S230 will now be described.

In the second prediction process at S230, using the second motion model, the CPU 11 calculates the predicted value of the state vector of the subject target in the current processing cycle based on the estimate of the state vector of the subject target acquired in the previous processing cycle.

Figure 12:
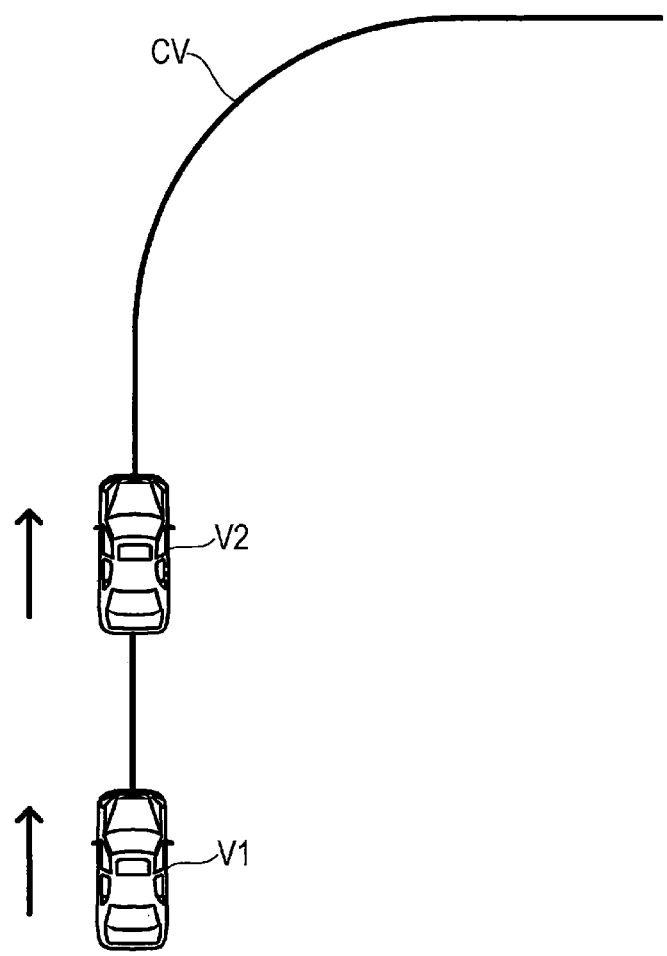
FIG. 12 is an illustration of the own vehicle traveling immediately before entering a curve of a road.

The second motion model is a turning motion model. As illustrated in FIG. 12, the turning motion model is used to detect a preceding vehicle V2 traveling on a curve CV of the road ahead of the own vehicle V1.

In the second motion model, the state quantities of the target are a lateral position x, a longitudinal position y, a velocity v, a direction of travel θ, an acceleration a, and a yaw rate ω. The state vector, which is a vector representation of these state quantities as elements, is expressed by $X=[x, y, v, \theta, a, \omega]^T$.

In the second motion model, the predicted values of the state quantities in the current processing cycle are represented by the state vector $X_{k|k-1}=[x', v', \theta', a', \omega']^T$, and the estimates of the state quantities in the previous processing cycle are represented by the state vector $X_{k-1}=[x, y, v, \theta, a, \omega]^T$. The function $f$ is then set such that a relationship shown in the equation (8) is established between the state vector $X_{k|k-1}$ and the state vector $X_{k-1}$.

$$\begin{bmatrix} x' \\ y' \\ v' \\ \theta' \\ a' \\ \omega' \end{bmatrix} = f\left(\begin{bmatrix} x \\ y \\ v \\ \theta \\ a \\ \omega \end{bmatrix}\right) = \begin{bmatrix} x + v\cos\theta\Delta T \\ y + v\sin\theta\Delta T \\ v + a\Delta T \\ \theta + \omega\Delta T \\ a \\ \omega \end{bmatrix} \quad (8)$$

That is, in the second prediction process at S230, using the function defined by the equation (8), the CPU 11 calculates the predicted value of the state vector in the current processing cycle according to the equation (1) and calculates the error covariance matrix of the predicted value of the state vector in the current processing cycle according to the equation (2).

The CPU 11 stores the calculated state quantities in the state quantity storage 13a provided in RAM 13.

Figure 13:
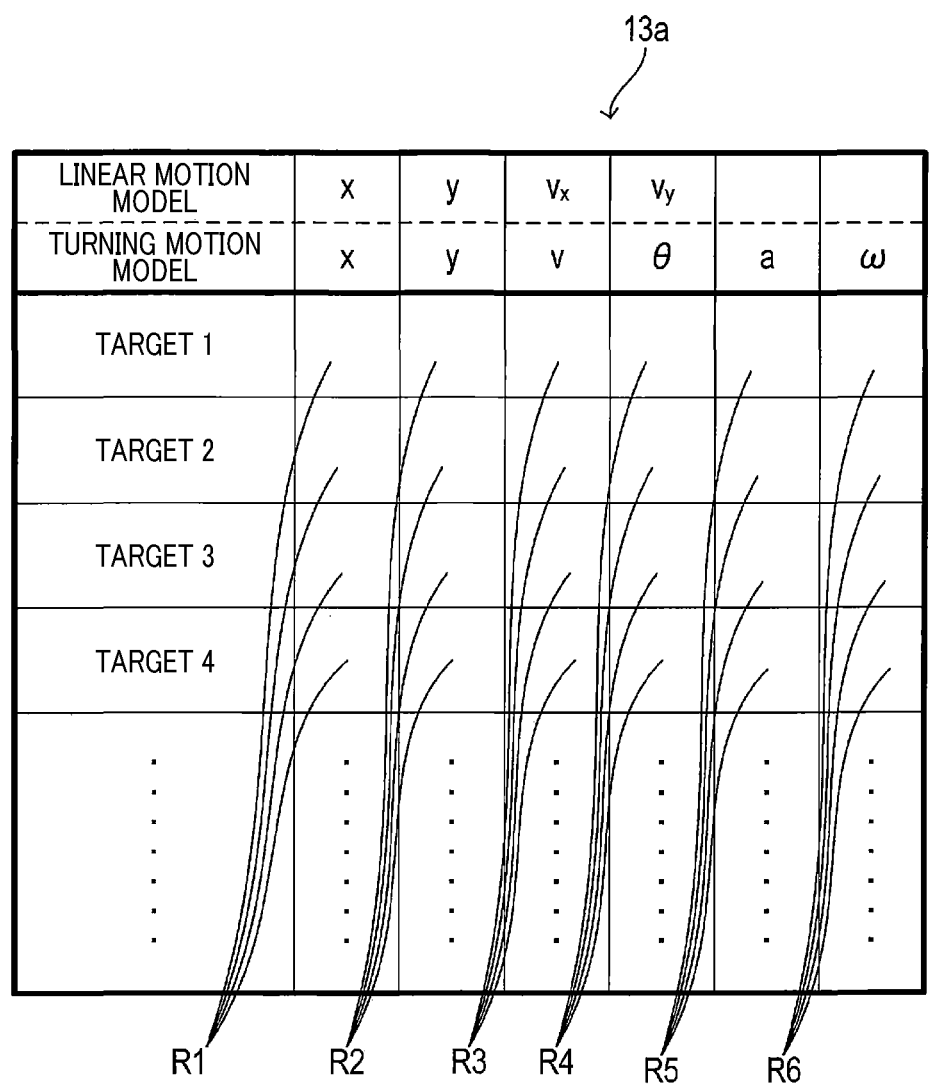
FIG. 13 is an illustration of a state quantity storage.

The state quantity storage 13a is configured to store [x, y, $v_x$, $v_y$] or [x, y, v, θ, a, ω] for each of the plurality of targets, as illustrated in FIG. 13. Specifically, storage areas R1, R2, R3, R4, R5, R6 are provided for each of the plurality of targets. When the estimate of the state vector of the target is calculated using the first motion model, the CPU 11 stores x, y, $v_x$, and $v_y$ in the storage areas R1, R2, R3, and R4 for the target, respectively. When the estimate of the state vector of the target is calculated using the second motion model, the CPU 11 stores x, y, v, θ, a, and ω in the storage areas R1, R2, R3, R4, R5, and R6 for the target, respectively.

Upon completion of the state quantity prediction process, the CPU 11, at S130, determines whether all of the one or more tracked targets have been selected at S110, as illustrated in FIG. 4. If not all of the tracked targets have been selected, the CPU 11 proceeds to S110. If all of the tracked targets have been selected, the CPU 11 terminates the prediction process.

Upon completion of the prediction process, the CPU 11 performs an association process to associate the reflection points detected by the radar device 2 with the tracked targets at S20 as illustrated in FIG. 3. The process flow of the association process performed at S20 will now be described.

Figure 6:
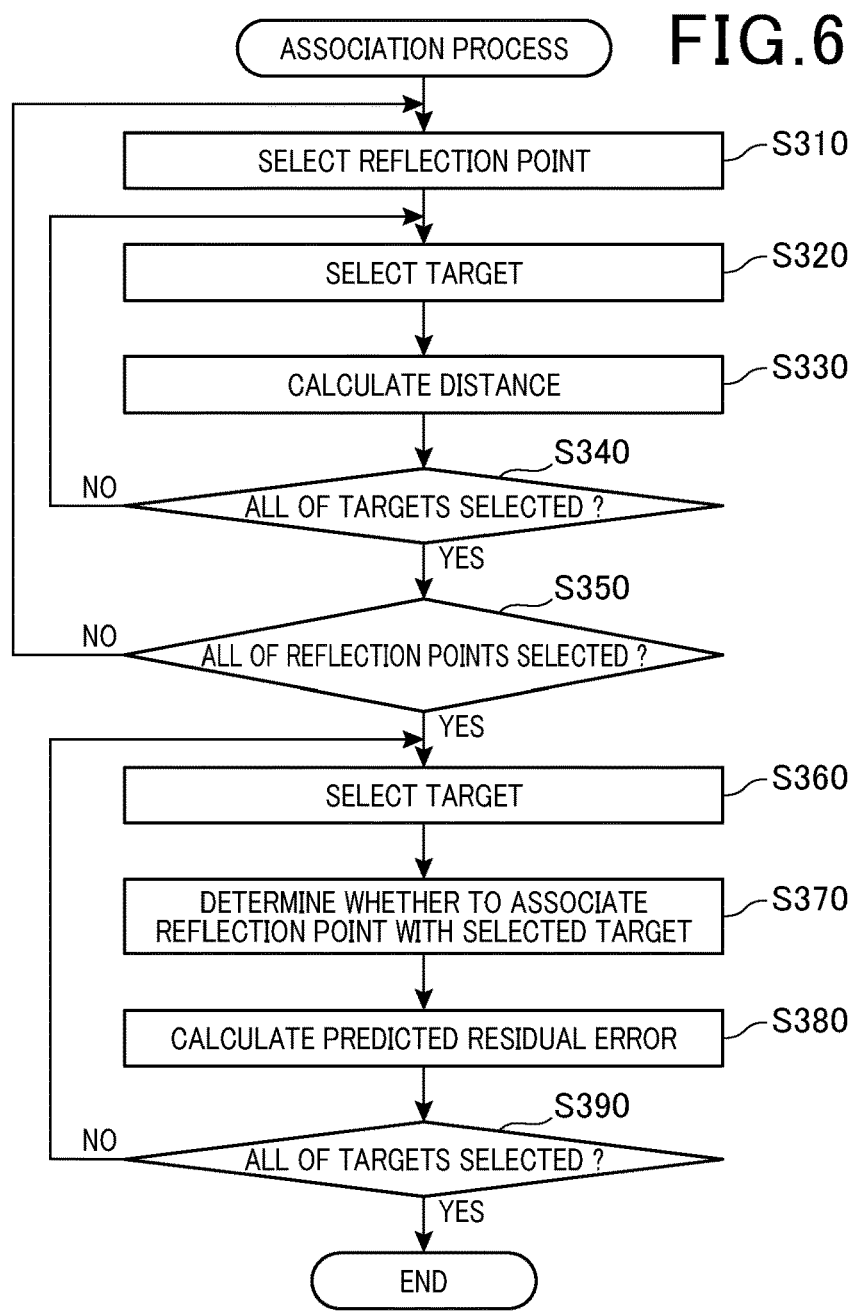
FIG. 6 is a flowchart of an association process.

As illustrated in FIG. 6, upon initiation of the association process, the CPU 11 first selects, from one or more reflection points detected in the current processing cycle at S310, one reflection point that has not been selected in the current association process. The selected reflection point is hereinafter referred to as a selected reflection point.

At S320, the CPU 11 selects, from one or more tracked targets, one tracked target that has not been selected in the current association process as a selected target. Further, at S330, the CPU 11 calculates a distance between the selected reflection point and the selected target.

At S340, the CPU 11 determines whether all of the one or more tracked targets have been selected at S320. If not all of the one or more tracked targets have been selected, the CPU 11 proceeds to S320. If all of the one or more tracked targets have been selected, then at S350 the CPU 11 determines whether all of the one or more reflection points detected in the current processing cycle have been selected at S310. If not all of the one or more reflection points detected in the current processing cycle have been selected, the CPU 11 proceeds to S310.

If all of the one or more reflection points have been selected, then at S360 the CPU 11 selects one of the one or more tracked targets for which the process of S370 has not been performed as the selected target. At S370, the CPU 11 determines, for each of the one or more reflection points, whether to associate the reflection point with the selected target based on the distance calculated at S330. The reflection point associated with the selected target is hereinafter referred to as an associated reflection point. As an association method, for example, provided that the reflection point with the minimum distance from the selected target Mj is the reflection point Pi and the target with the minimum distance from the reflection point Pi is the selected target Mj, then the reflection point Pi is associated with the selected target Mj.

At S380, the CPU 11 calculates a distance between the position of the selected target indicated by the predicted value of the state vector calculated at S120 and the position of the associated reflection point indicated by the observation information of the associated reflection point as a predicted residual error of the selected target.

Then, at S390, the CPU 11 determines whether all of the one or more tracked targets have been selected at S360. If not all of the one or more tracked targets have been selected, the CPU 11 proceeds to S360. If all of the one or more tracked targets have been selected, the CPU 11 terminates the association process.

As illustrated in FIG. 3, upon completion of the association process, the CPU 11 performs an elimination process at S30 to eliminate the tracked targets for which there are no associated reflection points. Specifically, each tracked target is provided with an elimination counter, and the CPU 11 resets the elimination counter for the tracked target in response to determining that there is an associated reflection point, and increments the elimination counter in response to determining that there is no associated reflection point. When the value of the elimination counter for the tracked target reaches a predefined value, i.e., when there are no associated reflection points during a predefined number of consecutive processing cycles, the CPU 11 eliminates the tracked target.

Then, at S40, the CPU 11 performs an update process to calculate the estimate of the state vector of each tracked target in the current processing cycle based on the predicted values of the state vectors of the tracked targets and the observation information of the associated reflection points associated with the tracked targets in the association process at S20. Specifically, the CPU 11 calculates, for each tracked target, the estimate of the state vector (i.e., the state vector $X_k$) and the estimate of the error covariance matrix (i.e., the matrix $P_k$) in the current processing cycle using the equations (3) to (6). The CPU 11 sets the predicted values of the state vector and the error covariance matrix of each tracked target determined at S370 to have no associated reflection points as the estimates.

Upon completion of the update process, the CPU 11 performs a model setting process at S50. The process flow of the model setting process performed at S50 will now be described.

Figure 7:
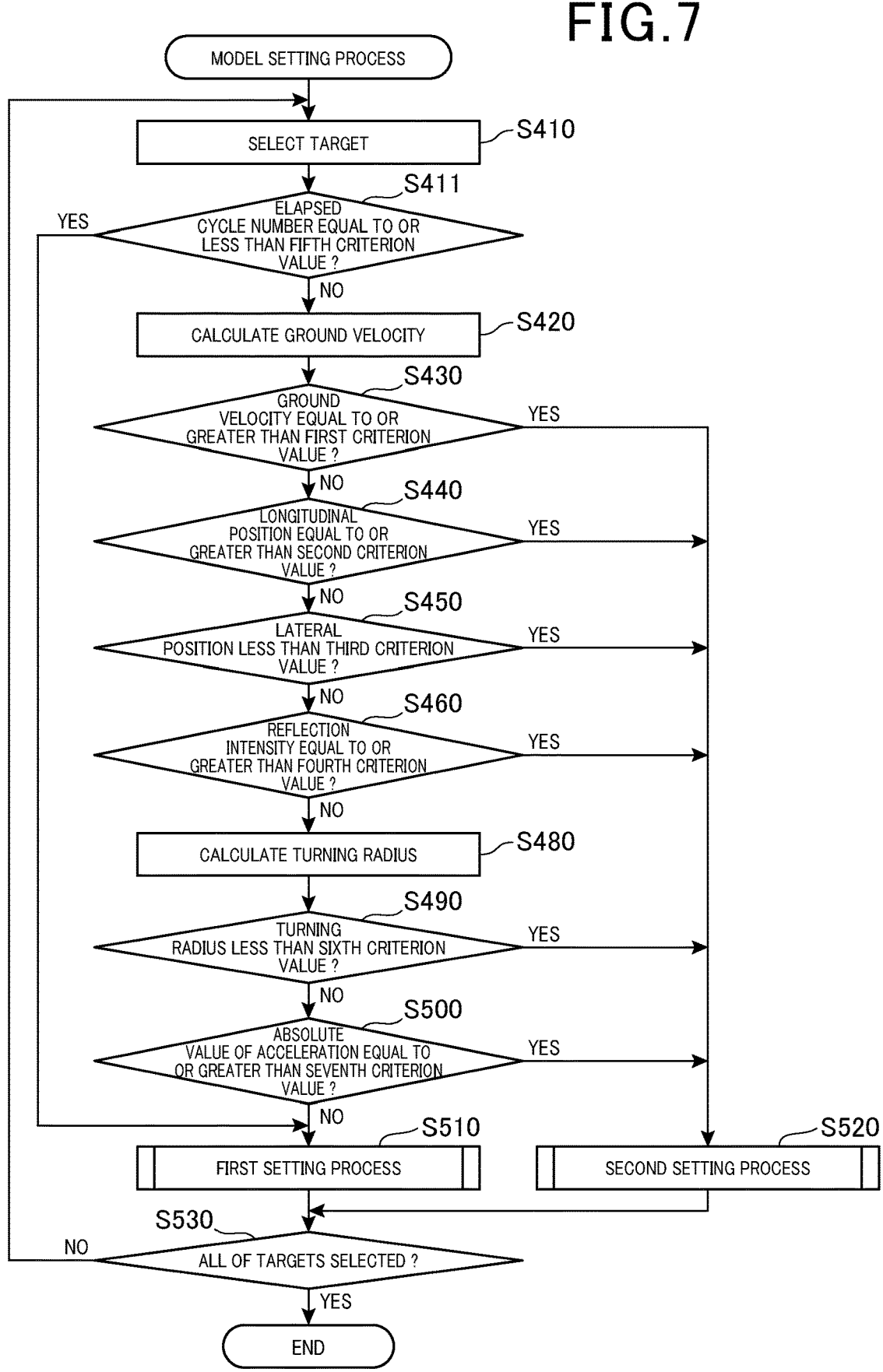
FIG. 7 is a flowchart of a model setting process according to the first embodiment.

As illustrated in FIG. 7, upon initiation of the model setting process, the CPU 11 first selects, from the one or more tracked targets, one tracked target that has not yet been selected in the current model setting process at S410. The selected tracked target is hereinafter referred to as a subject target.

Then, at S411, the CPU 11 determines whether the elapsed cycle number of the subject target, which will be described later, is equal to or less than a predefined fifth criterion value. An elapsed cycle counter is provided for each tracked subject target. The CPU 11 increments (i.e., adds one to) the corresponding elapsed cycle counter every time the repetition period of the processing cycle elapses after the tracked target is detected. The elapsed cycle number is a value of the elapsed cycle counter, and corresponds to the number of processing cycles that have elapsed since the subject target was detected.

If the elapsed cycle number is equal to or less than a fifth criterion value, the CPU 11 proceeds to S510.

If the elapsed cycle number exceeds the fifth criterion value, the CPU 11 calculates a ground velocity Vabs at S420 based on the own-vehicle velocity Vn acquired from the behavior sensors 3 and the longitudinal velocity calculated using the estimate of the state vector calculated at S40. The ground velocity Vabs is a travel velocity of the target relative to the ground. That is, the ground velocity Vabs is calculated by adding the relative velocity of the target along the direction of travel of the own vehicle to the travel velocity of the own vehicle.

Specifically, in response to the CPU 11 calculating the predicted value of the state vector in the first motion model at S120, the CPU 11 calculates the ground velocity Vabs according to the equation (9). In response to the CPU 11 calculating the predicted value of the state vector in the second motion model at S120, the CPU 11 calculates the ground velocity Vabs according to the equation (10).

$$Vabs = V_n + v_y \quad (9)$$

$$Vabs = V_n + v/\cos\theta \quad (10)$$

Then, at S430, the CPU 11 determines whether the ground velocity Vabs calculated at S420 is equal to or greater than a predefined first criterion value. If the ground velocity Vabs is equal to or greater than the first criterion value, the CPU 11 proceeds to S520. If the ground velocity Vabs is less than the first criterion value, then at S440 the CPU 11 determines whether the longitudinal position of the subject target is equal to or greater than a predefined second criterion value.

If the longitudinal position is equal to or greater than the second criterion value, the CPU 11 proceeds to S520. If the longitudinal position is less than the second criterion value, then at S450 the CPU 11 determines whether the lateral position of the subject target is less than a predefined third criterion value. If the lateral position is less than the third criterion value, the CPU 11 proceeds to S520.

If the lateral position is equal to or greater than the third criterion value, then at S460 the CPU 11 determines whether the reflection intensity of the subject target is equal to or greater than a predefined fourth criterion value based on the observation information corresponding to the subject target. If the reflection intensity is equal to or greater than the fourth criterion value, the CPU 11 proceeds to S520.

If the reflection intensity is less than the fourth criterion value, then at S480 the CPU 11 calculates a turning radius of the travel path along which the own vehicle is traveling based on the steering angle acquired from the behavior sensors 3.

Then, at S490, the CPU 11 determines whether the turning radius calculated at S480 is less than a predefined sixth criterion value. If the turning radius is less than the sixth predefined value, the CPU 11 proceeds to S520. If the turning radius is equal to or greater than the sixth criterion value, then at S500 the CPU 11 determines whether the absolute value of acceleration of the own vehicle is equal to or greater than a predefined seventh criterion value based on the acceleration of the own vehicle acquired from the behavior sensors 3.

If the absolute value of acceleration of the own vehicle is equal to or greater than the seventh criterion value, the CPU 11 proceeds to S520. If the absolute value of acceleration of the own vehicle is less than the seventh criterion value, then at S510 the CPU 11 performs a first setting process described later, and then proceeds to S530. If the absolute value of acceleration of the own vehicle is equal to or greater than the seventh criterion value, then at S520 the CPU 11 performs a second setting process described later, and then proceeds to S530.

Upon proceeding to S530, the CPU 11 determines whether all of the one or more tracked targets have been selected at S410. If not all of the one or more tracked targets have been selected, then the CPU 11 proceeds to S410. If all of the one or more tracked targets have been selected, then the CPU 11 terminates the model setting process.

The process flow of the first setting process performed at S510 will now be described.

Figure 8:
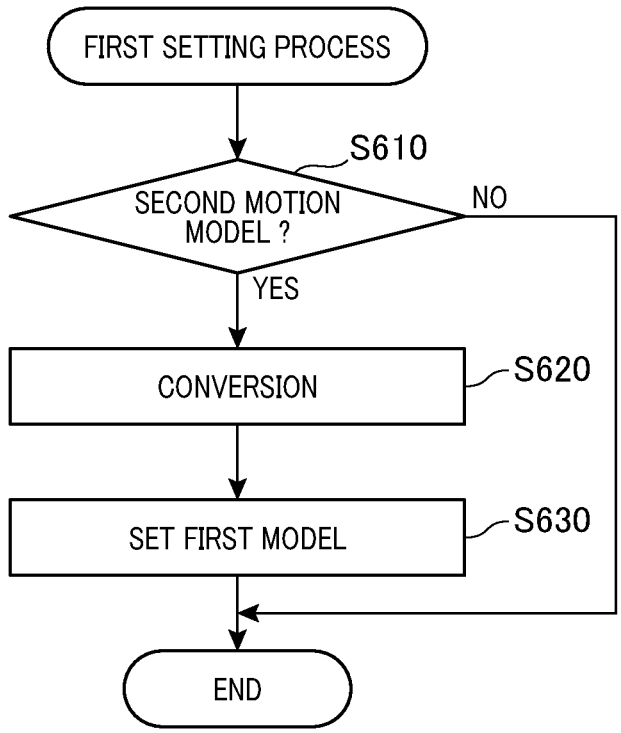
FIG. 8 is a flowchart of a first setting process.

Upon initiation of the first setting process, as illustrated in FIG. 8, the CPU 11, first at S610, determines whether the second motion model has been set for the subject target. If the second motion model has not been set, the CPU 11 terminates the first setting process. If the second motion model has been set, then at S620 the CPU 11 converts the state vector and the error covariance matrix represented by the state variables x, y, v, θ, a, and ω to the state vector and the error covariance matrix represented by the state variables x, y, $v_x$, and $v_y$. Then, at S630, the CPU 11 sets the first motion model for the subject target and terminates the first setting process.

The process flow of the second setting process performed at S520 will now be described.

Figure 9:
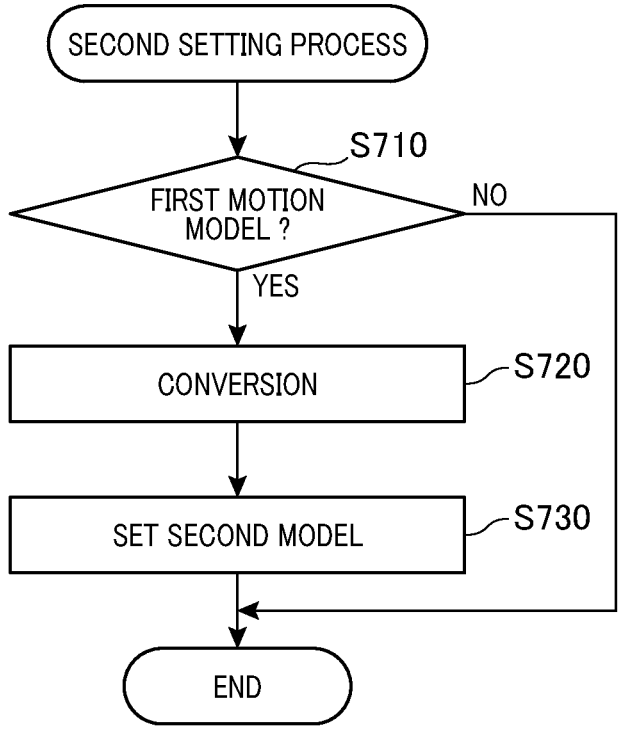
FIG. 9 is a flowchart of a second setting process.

Upon initiation of the second setting process, as illustrated in FIG. 9, the CPU 11, first at S710, determines whether the first motion model has been set for the subject target. If the first motion model has not been set, the CPU 11 terminates the second setting process. If the first motion model has been set, then at S720 the CPU 11 converts the state vector and the error covariance matrix represented by the state variables x, y, $v_x$, $v_y$ to the state vector and the error covariance matrix represented by the state variables x, y, v, $\theta$, a, $\omega$. Then, at S730, the CPU 11 sets the second motion model for the subject target and terminates the second setting process.

Upon completion of the model setting process, the CPU 11 performs a registration process at S60 to newly register reflection points that have not been associated with the tracked targets as new targets, as illustrated in FIG. 3. The process flow of the registration process performed at S60 will now be described.

Figure 10:
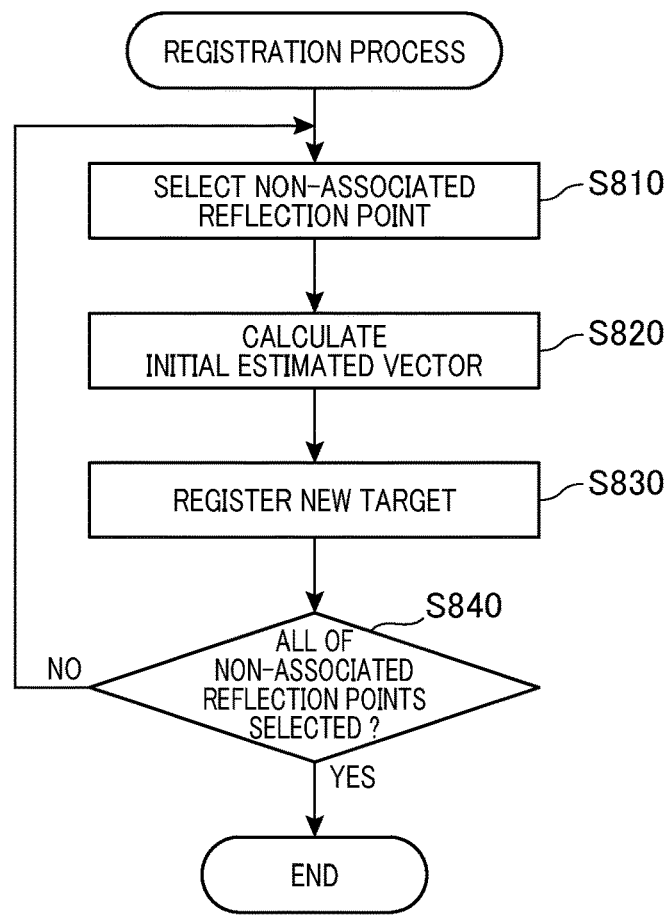
FIG. 10 is a flowchart of a registration process.

As illustrated in FIG. 10, upon initiation of the registration process, the CPU 11, first at S810, selects, from one or more reflection points detected in the current processing cycle that have not been associated with any tracked targets, which are hereinafter referred to as non-associated reflection points, one non-associated reflection point that has not been selected in the current registration process.

At S820, the CPU 11 calculates an initial value of the state vector (i.e., an initial estimated vector) expressed by $X=[x, y, v, \theta, a, \omega]^T$ based on the observation information of the selected non-associated reflection point (i.e., a distance to the reflection point, an azimuth of the reflection point, and a relative velocity of the reflection point) and the steering angle and the vehicle acceleration acquired from the behavior sensors 3.

Then, at S830, the CPU 11 registers the selected non-associated reflection point as a new target along with the initial estimated vector calculated at S820.

Further, at S840, the CPU 11 determines whether all of the non-associated reflection points have been selected at S810. If not all of the non-associated reflection points have been selected, the CPU 11 proceeds to S810. If all of the non-associated reflection points have been selected, the CPU 11 terminates the registration process.

As illustrated in FIG. 3, upon completion of the registration process, the CPU 11, at S70, generates the target information, outputs the generated target information to the assistance execution unit 5, and then terminates the tracking process. Specifically, at S70, the CPU 11 first converts the estimates of the state vectors of the one or more tracked targets and the initial values of the state vectors of the one or more new targets into the state vectors represented by the state variables of the first motion model (i.e., the state vectors represented by $X=[x, y, v_x, v_y]^T$). The estimates of the state vectors of the one or more tracked targets are calculated at S40, and the initial values of the state vectors of the one or more new targets are calculated at S50. That is, the CPU 11 performs a conversion process on the estimates of the state vectors of the one or more tracked targets and the initial values of the state vectors of the one or more new targets if they are represented by the state variables of the second motion model. In addition, the CPU 11 converts the error covariance matrices to error covariance matrices represented by the state variables x, y, $v_x$, $v_y$. Thus, the CPU 11 generates, as the target information, the estimates of the state vectors of the one or more tracked targets, converted to be represented by the state variables of the first motion model, the initial values of the state vectors of the one or more new targets, converted to be represented by the state variables of the first motion model, and the error covariance matrices, converted to be represented by the state variables of the first motion model.

The target tracking device 4 configured as above is mounted to the own vehicle and tracks one or more targets located in the surroundings of the own vehicle.

The target tracking device 4 estimates the estimate of the current state vector of each of the one or more targets based on the observation information of the one or more targets observed by the radar device 2 and the estimates $X_{k-1}$ of the past state vectors of the one or more targets, every time the predefined repetition period of the processing cycle $\Delta T$ elapses.

For each of the one or more targets, the target tracking device 4 selects one motion model from the preset first and second motion models based on at least either the states of the one or more targets or the state of the own vehicle.

The target tracking device 4 estimates, for each of the one or more targets, the estimate $X_k$ of the state vector using the selected one motion model.

In this way, the target tracking device 4 estimates, for one target, the estimate of the state vector using one motion model. Thus, the target tracking device 4 can suppress occurrence of a situation where multiple motion models are used in parallel for one target, and can thus suppress an increase in processing load. In addition, the target tracking device 4 selects one motion model from the plurality of motion models to estimate the estimate $X_k$ of the current state vector for each of the one or more targets. Therefore, the target tracking device 4 can select one suitable motion model for each of the one or more targets to estimate the estimate $X_k$ of the state vector, and can improve the estimation accuracy of the estimate $X_k$ of the state vector. This allows the target tracking device 4 to track the targets with high accuracy.

The first motion model is a linear motion model, and the second motion model is a turning motion model. Main targets for the vehicle-mounted radar system 2 are vehicles and pedestrians. A vehicle undergoes a turning motion according to the steering angle. Therefore, the turning motion model is suitable as the motion model. A pedestrian crossing a road ahead of the own vehicle is likely to undergo a linear motion, and unlike a vehicle, the pedestrian does not undergo a turning behavior with a certain turning radius. Therefore, the linear motion model is more suitable than the turning motion model.

The target tracking device 4 selects the second motion model in response to the ground velocity Vabs of the target being equal to or greater than the first criterion value.

The target tracking device 4 selects the second motion model in response to the longitudinal position of the target being equal to or greater than the second criterion value.

The target tracking device 4 selects the second motion model in response to the lateral position of the target being less than the third criterion value.

The target tracking device 4 selects the second motion model in response to the reflection intensity of the target being equal to or greater than the fourth criterion value.

The target tracking device 4 selects the first motion model in response to the elapsed cycle number of the target being equal to or less than the fifth criterion value.

The target tracking device 4 selects the second motion model in response to the turning radius of the own vehicle being less than the sixth criterion value.

The target tracking device 4 selects the second motion model in response to the absolute value of acceleration of the own vehicle being equal to or greater than the seventh criterion value.

The second motion model includes the acceleration a as a state variable. This allows the target tracking device 4 to increase the accuracy of tracking the target.

The target tracking device 4 selects the first motion model in response to the answer being NO at any one of S430, S440, S450, S460, S470, S490, and S500. The determination condition for each of S430, S440, S450, S460, S470, S490, and S500 is a second motion model selection condition for selecting the second motion model.

The target tracking device 4 further estimates the estimate $P_k$ of the error covariance matrix.

For each of the one or more targets, in response to one motion model being changed from a previous one, the target tracking device 4 converts the state vector and the error covariance matrix to correspond to the one motion model after the change from the previous motion model.

The target tracking device 4 includes a state quantity storage 13a to store the state vectors of one or more targets regardless of which motion model is selected. The state quantity storage 13a has a capacity sufficient to store the state vectors in the second motion model with the largest number of state variables among the first and second motion models. This allows the target tracking device 4 to store the state vectors in the first motion model and the second motion model in the shared state quantity storage 13a. Therefore, the target tracking device 4 does not need to provide separate data storages for the first and second motion models to store the state vectors in the first and second motion models, and can suppress an increase in data storage capacity.

The target tracking device 4 converts the state vectors and the error covariance matrices of one or more targets into those represented by the state variables x, y, $v_x$, $v_y$, and outputs them regardless of which motion model is selected. This allows the target tracking device 4 to eliminate the need for converting the state vectors and the error covariance matrices between the state variables of the first motion model and the state variables of the second motion model in the assistance execution unit 5. Therefore, the target tracking device 4 can facilitate use of the target information in the assistance execution unit 5.

Figure 1B:
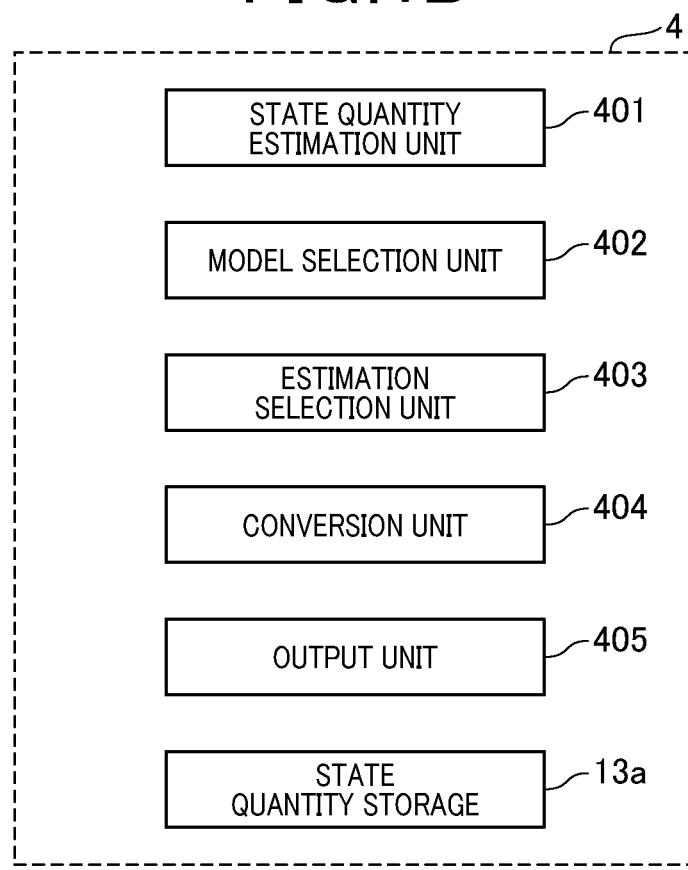
FIG. 1B is a functional block diagram of a target tracking device.

FIG. 1B illustrates a functional block diagram of the target tracking device 4. The target tracking device 4 includes, as functional blocks, a state quantity estimation unit 401, a model selection unit 402, an estimation selection unit 403, a conversion unit 404, and an output unit 405. Functions of these functional blocks 401-405 are implemented by the CPU 11 executing the program stored in the ROM 12. The target tracking device 4 further includes the state quantity storage 13a that is provided in RAM 13 as described above.

In the embodiment described above, S40, S220, and S230 correspond to the process steps to be performed by the state quantity estimation unit 401, S50 corresponds to the process step to be performed by the model selection unit 402, S210 corresponds to the process step to be performed by the estimation selection unit 403, and the state vectors correspond to the state quantities.

The ground velocity Vabs of the target, the longitudinal position of the target, the lateral position of the target, the reflection intensity of the target, the elapsed cycle number of the target, and the turning radius of the own vehicle correspond to selection parameters.

The first, second, third, fourth, fifth, sixth, and seventh criterion values correspond to selection criterion values.

The error covariance matrix corresponds to the error covariance, S620 and S720 correspond to the process steps to be performed by the conversion unit 404, S70 corresponds to the process step to be performed by the output unit 405, and the state variables x, y, $v_x$, $v_y$ correspond to common physical quantities.

Second Embodiment

A second embodiment of the present disclosure will now be described with reference to the accompanying drawings. In the second embodiment, only differences from the first embodiment will be described. The same reference numerals are assigned to the common components.

The driving assistance system 1 of the second embodiment differs from that of the first embodiment in that the model setting process is modified.

The model setting process of the second embodiment differs from that of the first embodiment in that the process steps S412, S414, and S416 are added.

Figure 14:
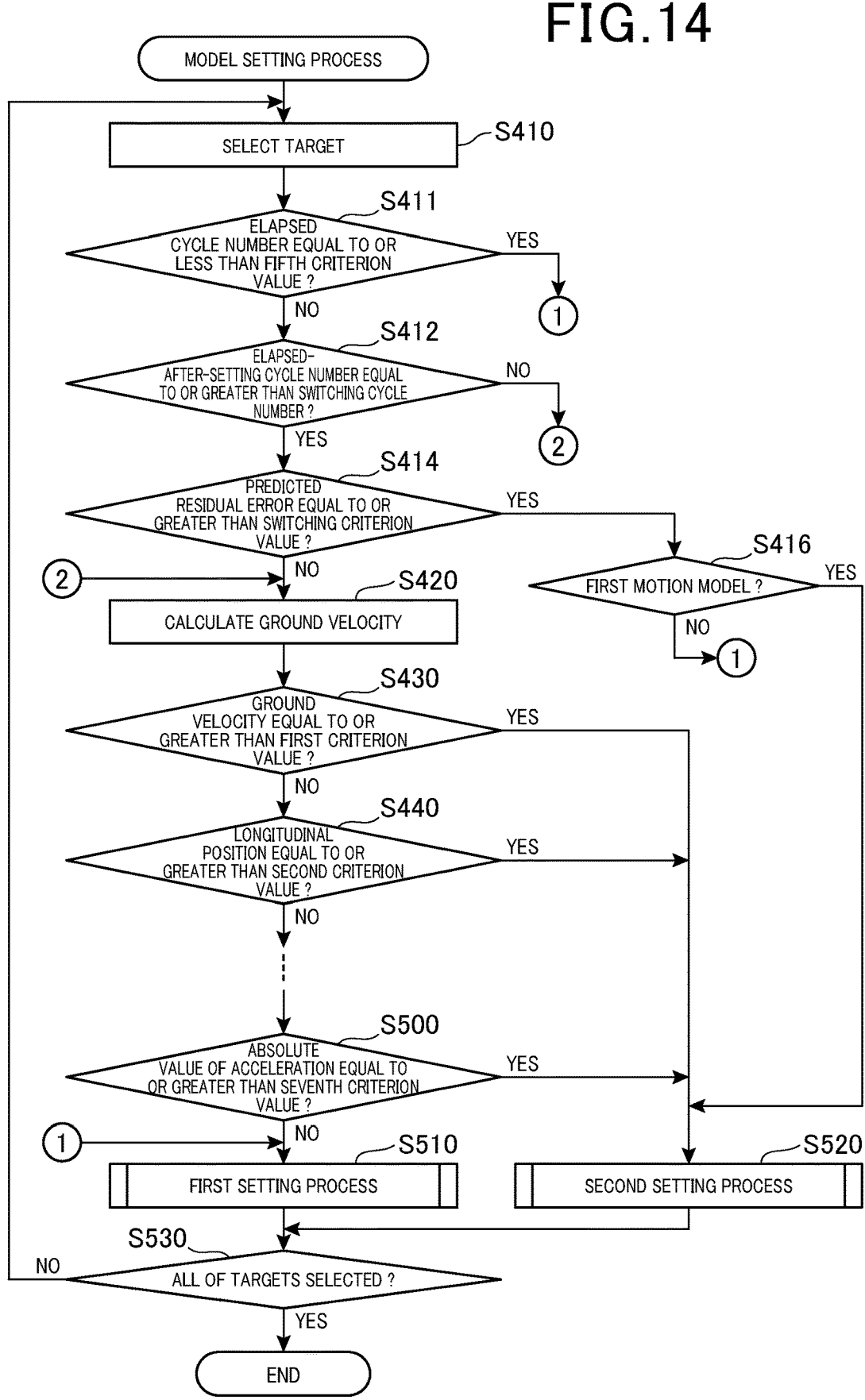
FIG. 14 is a flowchart of a model setting process according to a second embodiment.

That is, as illustrated in FIG. 14, if it is determined at S411 that the elapsed cycle number exceeds the fifth criterion value, then at S412 the CPU 11 determines whether the elapsed-after-setting cycle number of the subject target is equal to or greater than a predefined switching criterion cycle number. An elapsed-after-setting cycle counter is provided for each tracked target. The CPU 11 increments the corresponding elapsed-after-setting cycle counter every time the repetition period of the processing cycle elapses after the tracked target is detected. However, the CPU 11 resets the corresponding elapsed-after-setting cycle counter (i.e., sets to 0) every time the motion model is switched. The elapsed-after-setting cycle number is a value of the elapsed-after-setting cycle counter and corresponds to the number of processing cycles that have elapsed since the current motion model was set.

If the elapsed-after-setting cycle number is less than the switching criterion cycle number, then the CPU 11 proceeds to S420.

If the elapsed-after-setting cycle number is equal to or greater than the switching criterion cycle number, then at S414 the CPU 11 determines whether the predicted residual error of the subject target is equal to or greater than a predefined switching criterion value. If the predicted residual error is less than the switching criterion value, the CPU 11 proceeds to S420. If the predicted residual error is equal to or greater than the switching criterion value, then at S416 the CPU 11 determines whether the first motion model has been set for the subject target. If the first motion model has not been set, the CPU 11 proceeds to S510. If the first motion model has been set, the CPU 11 proceeds to S520.

The target tracking device 4 configured as above calculates the predicted value of the current state vector for each of the one or more targets based on the estimates of the past state vectors of the one or more targets, $X_{k|k-1}$. Then, the target tracking device 4 selects a motion model that is different from the previously selected one, in response to the elapsed-after-setting cycle number being equal to or greater than the switching criterion cycle number and the predicted residual error, which is a difference between the predicted value of the state vector (the position of the target in this embodiment) and the observed value indicated by the observation information (the position of the reflection point in this embodiment), being equal to or greater than the switching criterion value. In this case, the target tracking device 4 selects a different motion model from the previously selected one. This allows the target tracking device 4 to improve the accuracy of tracking the targets.

As above, while the specific embodiments of the present disclosure have been described above, the present disclosure is not limited to the above-described embodiments, and may be implemented with various modifications.

First Modification

For example, in the above embodiments, the first, second, third, fourth, fifth, sixth, and seventh criterion values are fixed values. Alternatively, the first through seventh criterion values may be changed depending on the one motion model that is selected. That is, the first through seventh criterion values when the first motion model is selected and the first through seventh criterion values when the second motion model is selected may be different from each other. This allows the target tracking device 4 to provide hysteresis in the threshold for switching between the first and second motion models, and suppresses occurrence of so-called chattering in which the motion model is frequently switched between the first and second motion models.

Second Modification

Figure 15:
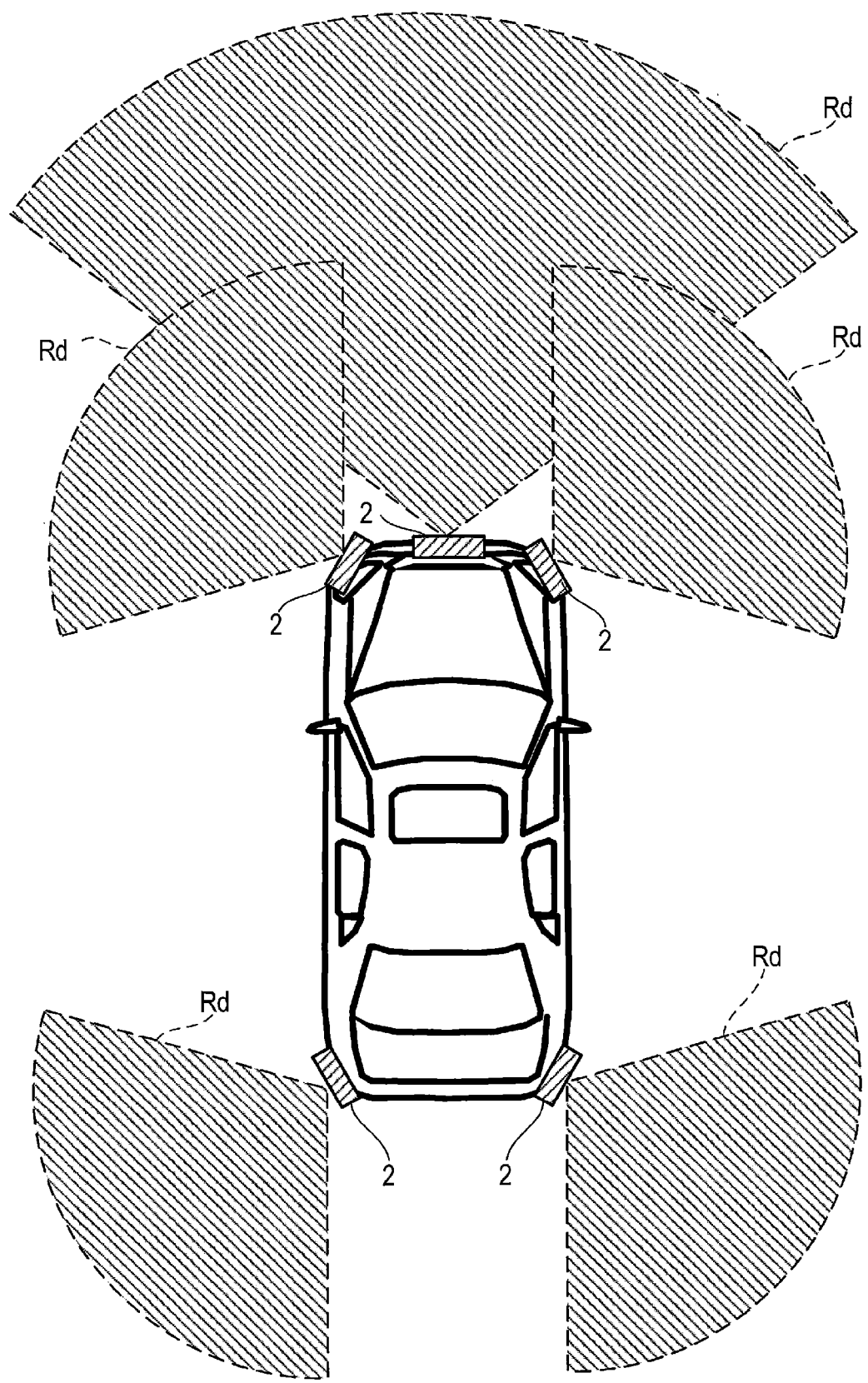
FIG. 15 is an illustration of installation positions and detection regions of radar devices according to another embodiment.

In the above embodiments, radar waves are transmitted in the forward direction of the own vehicle. In the present disclosure, the direction in which the radar waves are transmitted is not limited to the forward direction of the own vehicle. For example, as illustrated in FIG. 15, the radar waves may be transmitted not only in the forward direction of the own vehicle, but also in the right forward direction, the left forward direction, the right rearward direction, and the left rearward direction of the own vehicle.

Third Modification

In the above embodiments, the second motion model is selected in response to the ground velocity Vabs of the target being equal to or greater than the first criterion value. Instead of the ground velocity, the relative velocity may be used.

Fourth Modification

In the above embodiments, the second motion model is selected in response to the longitudinal position of the target being equal to or greater than the second criterion value. Instead of the longitudinal position, the distance between the own vehicle and the target may be used.

Fifth Modification

In the above embodiments, the second motion model is selected in response to the lateral position of the target being less than the third criterion value. Instead of the lateral position, the azimuth may be used.

Sixth Modification

In the above embodiments, the plurality of motion models include the first motion model and the second motion model. Alternatively, the plurality of motion models may include three or more motion models. In the above embodiments, the lateral velocity $v_x$ and the longitudinal velocity $v_y$ as the state quantities of the target in the first motion model are relative velocities. Alternatively, the lateral velocity $v_x$ and longitudinal velocity $v_y$ may be ground velocities.

The target tracking device 4 and its method described in the present disclosure may be implemented by a dedicated computer including a processor and a memory programmed to perform one or more functions embodied by computer programs. Alternatively, the target tracking device 4 and its method described in the present disclosure may be implemented by a dedicated computer including a processor formed of one or more dedicated hardware logic circuits, or may be implemented by one or more dedicated computers including a combination of a processor and a memory programmed to perform one or more functions and a processor formed of one or more dedicated hardware logic circuits. The computer programs may be stored, as instructions to be performed by a computer, in a non-transitory, tangible computer-readable storage medium. The technique for implementing the functions of each part included in the target tracking device 4 does not necessarily include software, and all of its functions may be implemented using one or more pieces of hardware.

A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to or replaced with the other embodiments.

Besides the target tracking device 4 described above, the present disclosure can be implemented in various modes such as a system including the target tracking device 4 as a constituent element, a program for causing a computer to serve as the target tracking device 4, a non-transitory tangible storage medium, such as a semiconductor memory, storing this program, a tracking method, and others.

What is claimed is:

1. A target tracking device for tracking one or more targets located in surroundings of a vehicle, the target tracking device being configured to be mounted to the vehicle and comprising an electronic control unit configured to:

every time a preset repetition period of a processing cycle elapses, estimate, for each of the one or more targets, a current state quantity based on at least either observation information of the one or more targets observed by a sensor or past state quantities of the one or more targets;

for each respective target of the one or more targets, select one motion model from a plurality of predefined motion models, the plurality of motion models including a first motion model and a second motion model, the first motion model being a linear motion model and the second motion model being a turning motion model, the selecting of the one motion model with respect to the respective target including:

determining whether at least one selection parameter, each of which is a predefined parameter that indicates a state of the respective target or a state of the vehicle, is equal to or greater than a predefined selection criterion value; and selecting the first motion model in response to the selection parameter that is an elapsed cycle number corresponding to a number of processing cycles which have elapsed since the respective target was detected being equal to or less than the selection criterion value;

for each respective target of the one or more targets, estimate the state quantity of the target with the one motion model, as selected; and track each respective target based on the state quantity of the respective target.

2. The target tracking device according to claim 1, wherein the selecting of the one motion model with respect to the respective target includes selecting the second motion model in response to the selection parameter that is a ground velocity or a relative velocity of the respective target being equal to or greater than the selection criterion value.

3. The target tracking device according to claim 1, wherein
the selecting of the one motion model with respect to the respective target includes selecting the second motion model in response to the selection parameter that is a longitudinal position of or a distance to the respective target being equal to or greater than the selection criterion value.

4. The target tracking device according to claim 1, wherein
the selecting of the one motion model with respect to the respective target includes selecting the second motion model in response to the selection parameter that is a lateral position or an azimuth of the respective target being less than the selection criterion value.

5. The target tracking device according to claim 1, wherein
the selecting of the one motion model includes selecting the second motion model in response to the selection parameter that is a reflection intensity of the respective target being equal to or greater than the selection criterion value.

6. The target tracking device according to claim 1, wherein
the selecting of the one motion model with respect to the respective target includes selecting the second motion model in response to the selection parameter that is a turning radius of the vehicle being less than the selection criterion value.

7. The target tracking device according to claim 1, wherein
the selecting of the one motion model with respect to the respective target includes selecting the second motion model in response to the selection parameter that is an absolute value of acceleration of the vehicle being equal to or greater than the selection criterion value.

8. The target tracking device according to claim 1, wherein
the selecting of the one motion model with respect to the respective target includes selecting the second motion model in response to a predefined second motion model selection condition being met, and select the first motion model in response to the second motion model selection condition being not met.

9. The target tracking device according to claim 1, wherein
the second motion model includes acceleration as a state variable.

10. The target tracking device according to claim 1, wherein the electronic control unit is further configured to:
calculate, for each respective target of the one or more targets, a predicted value of the current state quantity of the target based on an estimate of a past state quantity of the target, and
select the one motion model that is different from a previously selected motion model, in response to the elapsed-after-setting cycle number being equal to or greater than a predefined switching criterion cycle number and a predicted residual error, which is a difference between the predicted value of the state quantity and an observed value indicated by the observation information, being equal to or greater than a predefined switching criterion value.

11. The target tracking device according to claim 1, wherein
the selection criterion value is changed according to the one motion model selected.

12. The target tracking device according to claim 1, wherein
the electronic control unit is further configured to estimate an error covariance of the state quantities.

13. The target tracking device according to claim 12, wherein
the electronic control unit is further configured to, for each respective target of the one or more targets, in response to the one motion model having been changed from a previous motion model, convert at least either the state quantity or the error covariance to correspond to the one motion model after the change from the previous motion model.

14. The target tracking device according to claim 1, further comprising
a state quantity storage configured to store the state quantities of the one or more targets regardless of which one of the plurality of motion models is selected, wherein the state quantity storage has a capacity sufficient to store the state quantities in the one motion model with the largest number of state variables among the plurality of motion models.

15. The target tracking device according to claim 12, wherein
the electronic control unit is further configured to convert the state quantities and the error covariances of the one or more objects into common physical quantities regardless of which one of the plurality of motion models is selected, and output the common physical quantities.

16. A target tracking device for tracking one or more targets located in surroundings of a vehicle, the target tracking device being configured to be mounted to the vehicle and comprising an electronic control unit configured to:
every time a preset repetition period of a processing cycle elapses, estimate, for each of the one or more targets, a current state quantity based on at least either observation information of the one or more targets observed by a sensor or past state quantities of the one or more targets;
for each respective target of the one or more targets, select one motion model from a plurality of predefined motion models, the plurality of motion models including a first motion model and a second motion model, the first motion model being a linear motion model and the second motion model being a turning motion model, the selecting of the one motion model with respect to the respective target including:
determining whether at least one selection parameter, each of which is a predefined parameter that indicates a state of the respective target or a state of the vehicle, is equal to or greater than a predefined selection criterion value; and
selecting the second motion model in response to the selection parameter that is an absolute value of acceleration of the vehicle being equal to or greater than the selection criterion value;
for each respective target of the one or more targets, estimate the state quantity of the target with the one motion model, as selected; and
track each respective target based on the state quantity of the respective target.

17. A target tracking device for tracking one or more targets located in surroundings of a vehicle, the target tracking device being configured to be mounted to the vehicle and comprising an electronic control unit configured to:
- every time a preset repetition period of a processing cycle elapses, estimate, for each of the one or more targets, a current state quantity based on at least either observation information of the one or more targets observed by a sensor or past state quantities of the one or more targets;
- calculate, for each respective target of the one or more targets, a predicted value of the current state quantity of the target based on an estimate of a past state quantity of the target;
- for each respective target of the one or more targets, select one motion model from a plurality of predefined motion models based on at least either a state of the target or a state of the vehicle, the one motion model being different from a previously selected motion model and being selected in response to an elapsed-after-setting cycle number, which is a number of processing cycles that have elapsed since the one motion model currently selected was set, being equal to or greater than a predefined switching criterion cycle number and a predicted residual error, which is a difference between the predicted value of the state quantity and an observed value indicated by the observation information, being equal to or greater than a predefined switching criterion value;
- for each respective target of the one or more targets, estimate the state quantity of the target with the one motion model, as selected; and
- track each respective target based on the state quantity of the respective target.

* * * * *